Aug. 21, 1934.  E. C. CORDES  1,970,739
TAG HOLDER AND SHELF CONSTRUCTION
Filed Dec. 15, 1932
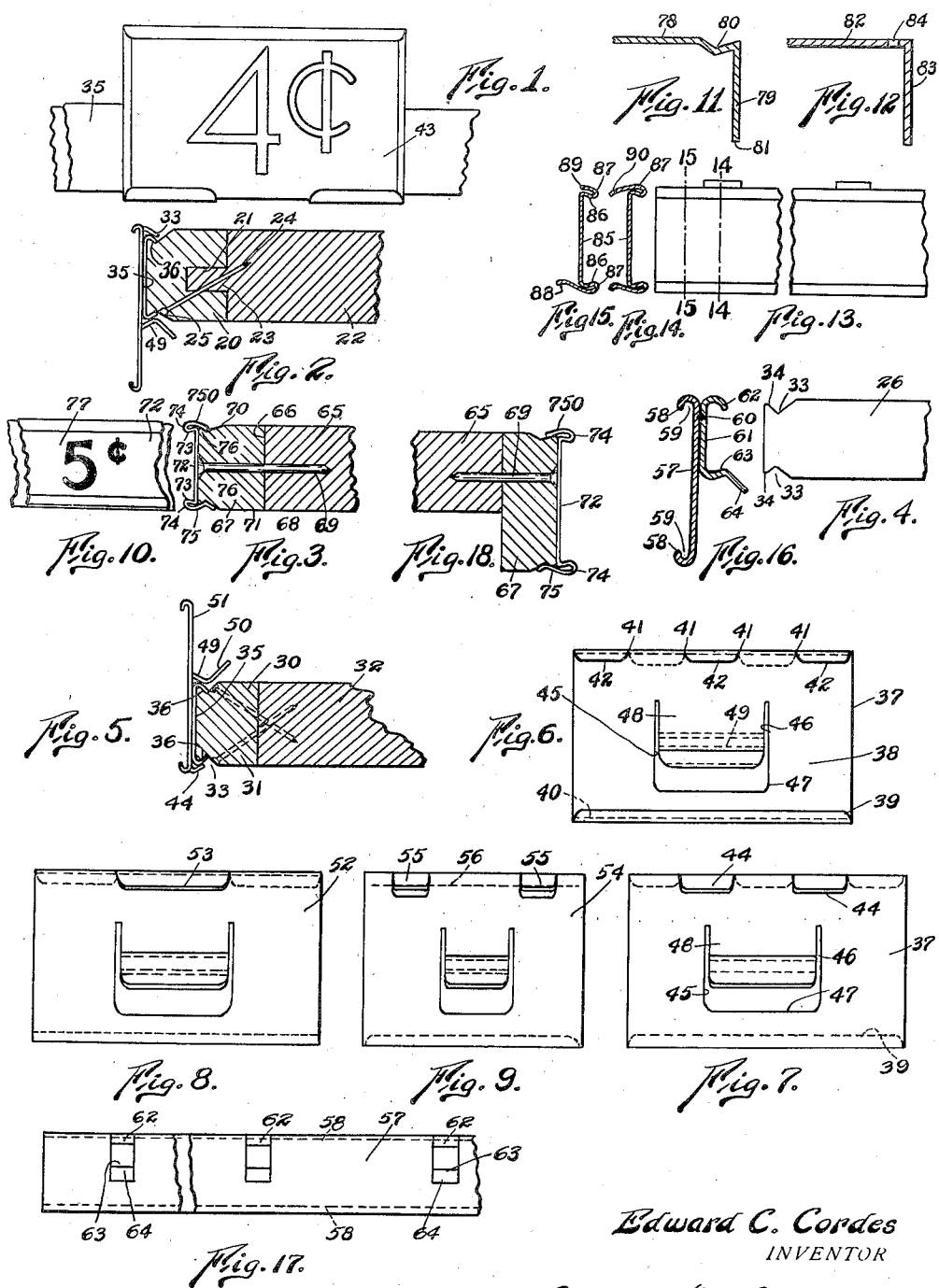
Edward C. Cordes
INVENTOR
BY Murray and Zugelter
ATTORNEYS Patented Aug. 21, 1934

1,970,739

UNITED STATES PATENT OFFICE 1,970,739

TAG HOLDER AND SHELF CONSTRUCTION

Edward C. Cordes, Cincinnati, Ohio

Application December 15, 1932, Serial No. 647,404

9 Claims. (Cl. 40—16)

The present invention relates to means for detachably but securely mounting price tags and the like upon the edges of store shelving and counters and has for its principal object the provision of means that is effective, easy to apply and that is free of accidental displacement.

Another object of the invention is to provide means of this kind that is adaptable to both metal and wooden shelving and which furthermore is of a decorative nature.

A further object of the invention is to provide for store shelving and the like an edge-binding strip which is both decorative and useful either as a means for directly receiving strip tags or for holding tag holders securely against accidental disassociation therefrom.

Another object of the invention is to provide a novel, readily attachable and detachable tag holder device for use with a shelf or the like which is edge-trimmed with the decorative material of the invention.

Another object of the invention is to provide a decorative metal facing suitable for receiving tag holders and which is applied without face nailing or other visible attaching means on or through the face thereof.

Another object is to provide a decorative metal tag holder on the edge of shelving and the like without the use of face nailing.

These and other special objects are attained by the means described herein and disclosed in the accompanying drawing in which:

Fig. 1 is a fragmental front elevational view of a shelf, tag holder and tag embodying my invention.

Fig. 2 is a cross sectional view of a shelf embodying the device of the invention and having the tag holder mounted in depending relation thereto.

Fig. 3 is a fragmental cross sectional view showing a shelf equipped with a modified form of tag holder.

Fig. 4 shows a modified form of a shelf adapted to receive a combined removable finish strip and tag holder.

Fig. 5 is a cross sectional view of the shelf and structure shown in Fig. 1.

Fig. 6 is a front elevational view of one form of removable tag holder.

Fig. 7 is a rear elevational view of the holder in Fig. 6.

Fig. 8 is a rear elevational view of a modified form of removable tag holder.

Fig. 9 is a rear view of still another modification of the removable tag holder.

Fig. 10 is a front view of the modification shown in Fig. 3 with a price tag in position.

Fig. 11 is a cross sectional view of a metal shelf adapted to receive a tag holder strip of the invention.

Fig. 12 is a fragmental cross sectional view of a modified sheet metal shelf also adapted to receive a tag holder strip of the invention.

Fig. 13 is a front elevational view showing a tag holder strip adapted to metal shelving as shown in Figs. 11 and 12.

Fig. 14 is a view on line 14—14 of Fig. 13.

Fig. 15 is a view on line 15—15 of Fig. 13.

Fig. 16 is a cross sectional view showing a modified form of member adapted for short tag holders and strip tag holders.

Fig. 17 is a rear elevational view of a strip of the device shown in Fig. 16, part being broken away.

Fig. 18 is a fragmental cross sectional view showing the adaptation of a relatively wide tag holder of the type shown in Fig. 3 to a shelf.

It is within the purview of this invention to provide tag holding means that is of wide adaptability to shelving, and which is of a readily attachable and removable nature, but which is free from the disadvantage of accidental displacement. The invention also contemplates the provision of the tag holder means in relatively short individual sections or members as well as in elongated or continuous members, the latter serving as a decorative metallic finish for the exposed edge of a shelf, without using a separate metallic covering strip for the edge of the shelf.

The following description will explain fully the adaptability of the tag holding means of the invention to a wide range of wooden shelving, both new and existing as well as to formed sheet metal shelving.

Adaptation to wooden shelving

In adapting the invention to wooden shelving it is in some cases found desirable to form the tag holding adapter in a separate strip for attachment to the front edge of either new or previously installed shelving. In the latter case it is intended that a workman may affix the adapting means without the necessity of dismantling the previously installed shelving. The adapting strip may be made in any of a plurality of forms, several of which are illustrated and numerous others of which will readily suggest themselves since they contemplate merely those practices common in wood joinery. The adapter strip 20 as shown in Fig. 2 consists of a wooden member having uniform grooving 21 cut into the rear face thereof and is adapted to be fixed to the front of a shelf such as 22 which has formed along its front edge tongue 23. The securing means may be suitably glued tongue and grooving or it may have in addition thereto toenailing as at 24, in which case the strip 20 may be spot bored as at 25 to insure proper insertion of the nails 24.

In Fig. 4 the shelf 26 has no separate adapter strip but is formed along its edge to accommodate the holder means of the invention. This integral form of shelf and adapter is effected in new or old shelving by means of machine or hand tool work and is especially adapted to receive the continuous type strips of combined covering and tag holding material shown in Figs. 3, 10, 13, 16, and 17. The forms shown in Figs. 3 and 13 may be made wide and applied to a relatively thin shelf by employing a wide adapter strip which is secured to the edge of the shelf by means of nails before manually applying the combined metallic tag holder and covering strip (see Fig. 18). In Fig. 5 the adapter strip 30 has the form of a butt joint toenailed as at 31 to shelf 32. It will be noted that these joints as well as other contemplated joints will be by preference of the invisible type in that there is no need for inserting fastening means through the front face of the strip. The adapter strips 20 and 31 as well as of many modified forms thereof are formed at their front edges with a longitudinal groove immediately adjacent thereto in the top and bottom faces of the strip. For the sake of clarity reference is made especially to Fig. 4 where the edge of the shelf is illustrative of this type of strip.

The thickness of the adapter strip may be uniform with or greater than the thickness of the shelf to which it is to be attached. When an adapter strip is employed the form of joint used requires that the new shelf have its complementary portion of the joint and that an existing shelf shall be modified in order to provide the complementary joint portion. A suitable groove 33 is cut along the top and bottom edges and these are intended to receive the complementary attaching members of the tag holder which will be hereinafter described.

Inasmuch as the short tag holder means of the invention may require relatively numerous mountings and removals over an extended period of use, the acute angle shoulders or beads 34 are clad with thin protective and decorative metal stripping which is preferably applied by machine prior to the attachment of the adapter strips to the shelves. For this reason there should be no fastening means for the adapter strip passing through the front face of the strip. Figs. 2 and 5 clearly illustrate the protective and decorative metal strip as applied to the adapter strips. This metal member 35 extends across the front face of the adapter strip throughout its length and has its longitudinal edges 36 turned about the beads 34 and pressed down into the grooves 33. By making these strips of suitably finished metal such as mild, thin stainless steel, chrome alloy, sheet metal and the like and applying them to the adapter strips, the shelving equipped therewith is at once protected against the wear of mounting and removing the tag holders and is modernized in appearance. This same beneficial advantage of modernizing the appearance of the shelves is carried out throughout the several modified forms of the invention. The adapter strips 20 and 31 with the decorative and protective strip 35 affixed present an overall width equal to the thickness of the strip or shelf. This is effected by reducing the distance between the shoulders 34 by a distance equal to two thicknesses of the metal used in strips 35.

*The individual tag holders*

In Figs. 6, 7, 8 and 9 are illustrated the individual tag holder devices which are intended for use with the adapter strip shown in Figs. 2 and 5, these being shown operatively connected with the shelving in Figs. 1, 2 and 5. As shown in Figs. 6 and 7, the tag holder 37 comprises a single sheet of metal 38 which preferably is formed of thin, mild stainless steel or any other metal which might harmonize in appearance with the strips 35 and which will have mild resiliency. The sheet 38 has along one edge an upturned lip 39 forming a tag receiving groove 40 along one face of the body 38. The opposite edge of the body 38 is slitted at a plurality of places 41 for a short distance and alternate tabs 42 are turned down complementary to the lip 39 so that the lip 39 and these intermittent lips or tabs may together receive and hold an inserted price tag such as 43 (see Fig. 1). The purpose of providing a plurality of spaced lips forming tag receiving grooves is to enable the user to make up a legend of a plurality of small pieces of tag material. Those tabs or sections 44 intermediate the tabs or sections 42 are turned to the opposite face of the body 38 and form rigid hooked lugs that are adapted to seat in one of the grooves 33 and hook about the bead or shoulder 34. Interiorly of the body 38 the metal is cut free along lines 45, 46, and 47, these lines preferably being at right angles to one another and providing a free tongue 48 which is bent rearwardly as at 49 in complement to the tabs or hooked gripping lugs 44 and then angularly therefrom to provide a finger piece 50. This tongue 48 and the gripping member 49 are flexible or yieldable relative to the body 38 so that the resultant tag holder may be securely but detachably mounted on the adapter strip by hooking the lugs 44 in one of the grooves 33 and pressing the tag holder body against the front face of the strip whereupon the tongue, and especially the gripping portion or lug 49 will yield and then snap into the opposed groove 33. It will now be found that accidental pressures or blows directed to the projecting portion 51 of the tag holder 37 will not release the gripping effected by members 44 and 49, and that in order to remove the tag holder from its mounting it is necessary to exert pressure on the finger piece 50 sufficiently to flex the tongue 48 and raise the gripping lug 49 free of the shoulder on the adapter strip. When this is done the removal is easy and quick. The tag holder 52 (see Fig. 8) is identical in all respects with the holder illustrated in Figs. 6 and 7, save that there is but a single lug 53 spaced opposite the resilient gripping lug 49 instead of a plurality of such members as in the previously described embodiment. In Fig. 9 the tag holder 54 is likewise formed according to the general construction just described save that the fixed hooked gripping lugs 55 are struck from the interior portion of the body of the holder 54, thus allowing a continuous tag holder lip 56 to be formed along the top as well as the bottom of the holder.

The removable tag holders just described have been of one piece construction. They are intended to be made up in either short sections, as illustrated, for attachment at desired loctations or extended along the entire edge of the shelf using two or more gripping means. In Fig. 16 there is illustrated a two piece construction of tag holder which is adapted to fabrication either in short sections or in elongated strips with shelf gripping members disposed at suitable intervals. The tag holder of Fig. 16 comprises a suitable strip of metal 57 having continuous and uniform turned edges 58 providing grooves 59 for the reception of the edges of price tags and, to the back of a strip of such formed metal of any desired length is attached, as by spot welding 60, one or more gripping members 61 which have hooked gripping lug 62 at the top thereof and hooked gripping lug 63 with a projecting finger piece 64. By spot welding this member relatively closer to the lug 62 there is provided a requisite amount of resiliency between the gripping means and the tag holding strip so that accidental contact with the strip 57 will not disengage the gripping engagement between members 62 and 63 with the edge of a shelf. There is attained furthermore a sufficient resiliency in the member 61 to permit the application and removal thereof in the manner hereinbefore indicated.

In Figs. 3 and 10 and 18 there is illustrated a simplified modification of the tag holder and adapter strip of the invention, this embodiment being adaptable to existing shelving as well as new shelving without the necessity of trimming or especially forming the edges of the shelves. In the use of this embodiment it is necessary that the shelf 65 have a plane front edge 66. The adapter strip 67 of any desired width has a face 68 adapted for flush abutment with face 66 of the shelf and it is secured by simply driving nails or other fastening members 69 directly through the adapter strip into the shelf. On the top and bottom faces 70 and 71 respectively of the adapter strip 67 are continuous shallow grooves corresponding somewhat to the grooves 33 as shown in Fig. 4 but being considerably shallower. The angularity of the adjacent wall of the groove to the top face of the adapter strip would be something of the order of ten degrees (10°). A continuous price tag strip indicated generally at 72 is formed of a strip of sheet metal turned forwardly about 10° along each edge as at 73 and then turned backwardly on itself with a slight round at 74 to produce elongated resilient flanges or clips 75 and 75o which may be spread away from each other and passed over the shoulders 76 to seat in the shallow grooves. The curvature of the entire flange 75 should also assume somewhat the angularity of the groove in which it seats. Flange 75o, as shown, need merely be wide enough to hook over a shoulder 76. This provides on the face of strip 72 a continuous slightly undercut or dovetailed channel in which price tags or strips 77 may be readily inserted and which are free from accidental displacement.

*Metal shelving and adaptation of the tag holders thereto*

The devices of the invention are adapted, with very little modification, to use upon sheet metal shelving. It is intended that formed sheet metal shelving may have the usual depending front face thereof adapted to be completely covered by a continuous strip for example such as illustrated in Fig. 16 or to the use of holders such as are illustrated in Figs. 6, 8 and 9, as well as to the hereinafter described tag holding means. The metal shelf 78 normally has a front depending flange 79 and the edge of the shelf 78 immediately adjacent the front flange 79 may be either continuously grooved or corrugated as at 80 or groove 80 may be interrupted if desired. With this form of shelf the grooving or corrugation may serve somewhat to strengthen the shelving as well as to afford a seat for the upper portion of the tag holding device, while the bottom edge 81 of the flange receives the complementary gripping piece of the tag holder.

As shown in Fig. 12, the shelf 82 may have a simple depending front flange 83 with interrupted slots 84 in the shelf 82 immediately adjacent the junction thereof with the flange.

In Fig. 13 there is illustrated a front elevational view of a tag holder which is adapted to be removably mounted on either form of metal shelf. This consists of a strip of metal 85 having both its longitudinal edges turned forwardly as at 86 and then turned upon themselves as at 87. The lower flange extends for a greater distance to provide a resilient gripping member 88 which is continuous along the bottom of the strip. The upper edge has the flange cut short as at 89 except at intervals where fingers 90 are allowed to remain for the purpose of engaging the groove 80 of shelf 78 or slot 84 of shelf 82. This form of stripping will serve to cover and provide a decorative finish for the normally exposed depending flange portion of the metal shelves of the types illustrated as well as of such modified forms of shelf as may readily suggest themselves.

*Summary*

In each of the embodiments the height of the card or tag holder may be such as to receive and hold cards or tags of a predetermined height which may be equal to or greater than the width of the flange in metallic shelves, or to the width of the adapter strip, or to the thickness of the shelf itself accordingly as the several illustrated forms are employed. Strips formed as in Fig. 16 may be adapted to either wooden or metal shelving. Likewise the adapter strips, especially as shown in Fig. 18, may be of greater width than the thickness of the shelf in order to accommodate the tag holding means used in conjunction therewith. In the remaining embodiments the distance between the resilient and non-resilient fingers can be made so as to accommodate a grooved shelf or a shelf equipped with an adapter strip of substantially any required width.

From the foregoing it will be noted that in each form of the invention a shelf with shoulders at the front edge of top and bottom faces may be supplied with either short or continuous tag holders that are removable but not accidentally displaceable.

What is claimed is:

1. In a tag holder the combination of a shelf having a shallow V groove forming a shoulder immediately along the edge thereof at the top and bottom, of a holder body for receiving a tag card, means on one edge of the holder body for engaging about one of said shoulders on the shelf and a cooperative member on said body adapted to be sprung about the other shoulder on the shelf for removably mounting the holder on the shelf.

2. In combination a shelf having shoulder members at the top and bottom thereof adjacent the edge of the shelf, a card holder member and means on said card holder member engageable about the shoulders to mount the holder on the edge of the shelf, one of said engageable means being substantially rigid on the holder member, the other engageable means being flexible relative to the holder and the remaining engageable member.

3. The combination with a shelf, of an adapter strip adapted to be secured along the edge of the shelf, said adapter strip forming a part of the shelf and being longitudinally grooved on its top and bottom faces immediately adjacent the front edge of said strip, a sheet metal strip protectively covering the front edge of the adapter strip and extending into the grooves therein and a card holder member having a yieldable and a nonyieldable finger for engagement in said opposed grooves for removably retaining the holder on the front edge of the adapter strip against accidental separation therefrom.

4. In combination a shelf having a shoulder at each of its forward edges on the top and bottom faces thereof and within the body lines thereof, and a metallic strip covering the edge of the shelf and having flange portions engaging about said shoulders, said strip being provided intermediate each flange and the body of the strip with integral longitudinal shoulders overhanging the face of the strip for receiving and retaining price tags and the like.

5. The combination with a shelf having shoulders at the forward edges of its upper and lower faces, of a metallic body having portions thereof turned forwardly to provide opposed tag holding grooves and attaching means comprising a fixed hooked lug and a yieldable hooked lug, the yieldable lug having a projection thereon providing for the manual flexing thereof relative to the fixed lug whereby the said lugs are cooperatively engaged on and disengaged from the shoulders on said shelf.

6. In a device of the class described, the combination of a metallic body having opposed turned edge portions at the top and bottom thereof for receiving a card, a tongue member cut from the interior body and having its free end developed into an intermediate hooked lug and a terminal finger piece, whereby the lug may be flexed relative to the body, and a nonyieldable companion lug on said body cooperating with the flexible lug for gripping opposed shoulders of a shelf.

7. The combination with a shelf having shoulder portions immediately adjacent the front edge thereof, of a metallic price tag strip comprising an elongated sheet metal body turned along its opposite longitudinal edges to provide a way for the reception of a card and rearwardly projecting hooked portions on said strip for engaging about the shouldered edges of the shelf.

8. In a tag holder the combination of an elongated strip of sheet metal, inwardly turned flanges along opposed longitudinal edges thereof for receiving a card, a second metal member having inwardly turned lugs at its opposite sides, said second member being secured to the first member adjacent one of said lugs, and a finger piece on the free end of one of said lugs whereby said lug may be flexed relative to the other lug.

9. The combination of a shelf having shallow grooves forming shoulders immediately adjacent the front edge thereof on the top and bottom faces of said shelf, a metallic body member adapted to receive a price card and to be disposed, at least in part, across the front edge of the shelf and securing means to removably attach the metallic body member to the shelf comprising a rigid hooked lug for cooperation with one of the shoulders on the shelf and a second hooked lug secured to and extending in part across the edge of the shelf for cooperating with the other of said shoulders on the shelf, said second mentioned hooked lug being provided with an extended finger piece for flexing said lug.

EDWARD C. CORDES.